Oct. 16, 1945.    R. N. WALLACH ET AL    2,386,826
PROCESS AND APPARATUS FOR TREATING FLUID COMPOSITIONS
Filed Jan. 10, 1942    2 Sheets-Sheet 1

INVENTOR.
ROGER N. WALLACH
BY and JUSTIN ZENDER
ATTORNEY.

Oct. 16, 1945.  R. N. WALLACH ET AL  2,386,826
PROCESS AND APPARATUS FOR TREATING FLUID COMPOSITIONS
Filed Jan. 10, 1942  2 Sheets-Sheet 2

INVENTOR.
ROGER N. WALLACH
BY and JUSTIN ZENDER
Worth Wade
ATTORNEY,

Patented Oct. 16, 1945

2,386,826

UNITED STATES PATENT OFFICE 2,386,826

PROCESS AND APPARATUS FOR TREATING FLUID COMPOSITIONS

Roger N. Wallach, Braircliff Manor, and Justin Zender, Ardsley, N. Y., assignors to Sylvania Industrial Corporation, Fredericksburg, Va., a corporation of Virginia Application January 10, 1942, Serial No. 426,354

5 Claims. (Cl. 210—8.5)

The invention relates in general to a process for the separation of liquids from liquids or liquids from solids and to an apparatus for use in such a process and to correlated improvements designed to enhance the efficiency and extend the utility of such a process.

Such common operations as evaporation and distillation have long been known as means for separation of liquids from liquids or liquids from solids. However, in the dehydration of foodstuffs which undergo changes upon heating and in the concentration of heat-unstable fluids such as fruit juices, milk, blood, latex and the like, known methods of evaporation, including vacuum evaporation, are either complicated, expensive or show a low degree of efficiency. The evaporation of milk for the purpose of producing concentrated milk or a powdered milk is not practical at room temperature because the rate of evaporation is much too slow. If vacuum is employed, the expense of such evaporation becomes excessive. On the other hand, if heat is employed to facilitate the evaporation, undesirable changes occur in the milk which alters the flavor and chemical nature of the product. These difficulties occur to an even greater extent with such heat-unstable colloidal systems as blood, latex and many fruit juices. It is also obvious that known methods of filtration through porous membranes will not achieve the desired separation and concentration of such systems as milk, blood, latex or fruit juices because the filtrate will contain a substantial quantity of essential ingredients as well as the water which it is desired to extract. Accordingly filtration is only possible when it is desired to separate the fluids from the solids in such systems.

It is a general object of the present invention to provide means for the separation of liquids from liquids and liquids from solids in a rapid, efficient manner which does not adversely affect the properties of such materials and which avoids the disadvantages inherent in known processes of evaporation and filtration.

It is another object of the invention to provide a method for the concentration of solutions in a rapid, economical and continuous manner.

It is another object of the invention to provide a rapid, economical and continuous method for the evaporation of heat-unstable fluid compositions for the purpose of concentrating, dehydrating, separating and drying of such compositions.

It is another object of the invention to provide a process for the continuous separation, concentration or evaporation of fluid compositions by the use of semi-permeable membranes.

It is a further specific object of the invention to provide an apparatus for the rapid, efficient and continuous separation, concentration and evaporation of fluid compositions.

Other objects of the invention will in part be obvious and will in part appear hereinafter.

According to the present invention, fluid systems, either solutions, colloidal systems or suspensions are treated to separate liquids from liquids or liquids from solids by passing such fluid compositions continuously into contact with a semi-permeable membrane and causing the evaporation of one or more of the liquids in such composition through a wall of said membrane into a gaseous atmosphere which is in contact with the other side of said membrane and continuously drawing off the materials which do not pass through the semi-permeable membrane.

The apparatus of the invention comprises in general a semi-permeable membrane, means for continuously supplying a fluid composition to one side of said membrane and means for maintaining a moving body of gas on the outside or surface of said membrane and means for withdrawing the liquids or solids which do not pass through said membrane and preferably means for heating the fluid in contact with the membrane.

In the present invention the expression "semipermeable" when applying to the membranes employed is intended to designate a membrane which is permeable to at least one liquid which comprises the fluid composition in contact with such membrane and which is impermeable to another liquid or to a solid contained in such composition.

The invention accordingly comprises a process having the relation of steps and an apparatus having the elements or relation of elements one to another or as set forth in the following detailed description and scope of the application all of which will be indicated in the claims.

For a more complete understanding of the nature and objects of the invention reference should be had to the accompanying drawings in which Fig. 1 is a side elevation partly in section of one embodiment of the apparatus of the invention;

Figure 1:
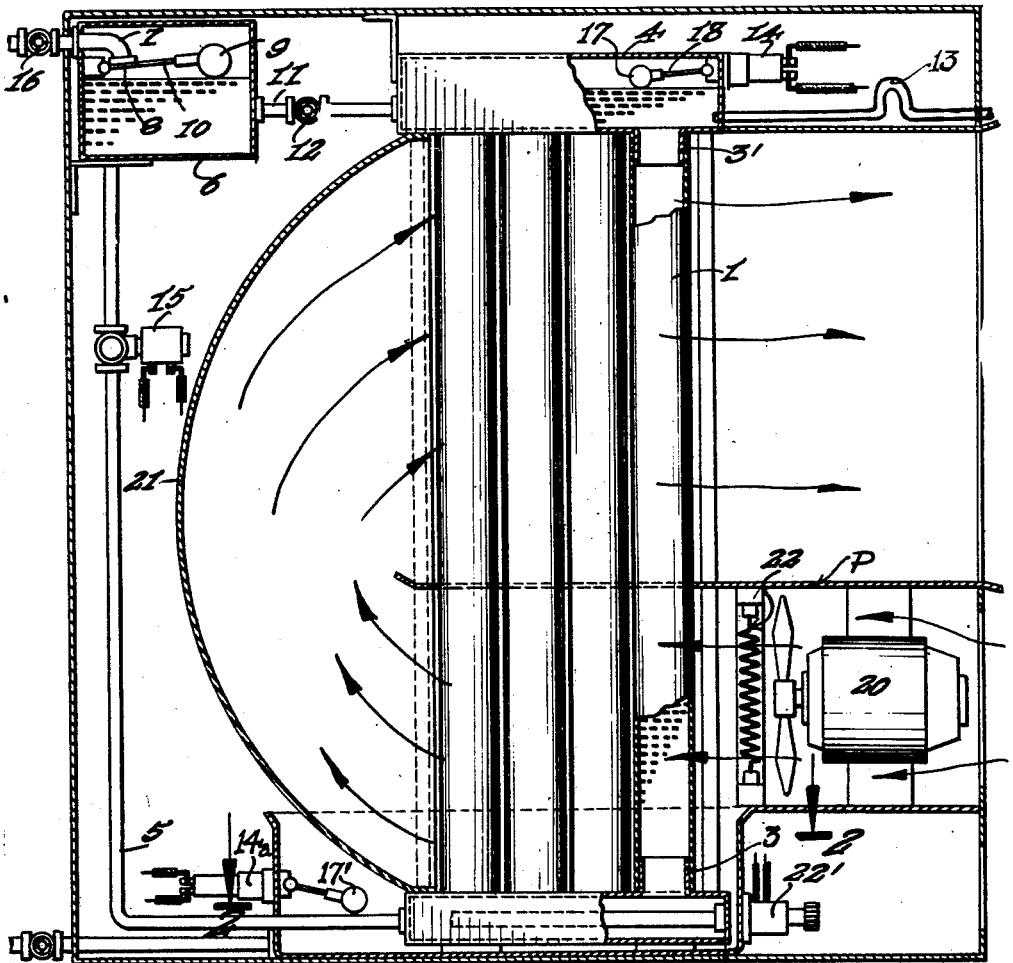

The process of the invention is adapted for separating, concentrating and evaporating fluid compositions of all kinds whether solutions, colloidal systems or suspensions. Among the aqueous compositions which may be treated in the process of the invention there may be mentioned aqueous solutions of inorganic or organic compounds in particular, salt solutions, sugar solutions and aqueous solutions containing miscible organic liquids such as alcohol, esters, ketones, organic acids, glycerol, the glycols and other oxygen-containing compounds as a class when the substances are miscible or soluble in water. The process is also adapted for separating, concentrating or evaporating colloidal systems of all kinds including by way of example, fruit juices as a class, pectins as a class, milk, blood, molasses, coffee extracts, rubber latex, and other natural animal or vegetable colloidal systems as well as artificially prepared colloidal systems such as artificial latex, oil and water emulsions, vitamin concentrates and the like. The process is also adapted for the separation, concentration or evaporation of non-aqueous organic liquid compositions including mixtures of two or more organic liquids or mixtures of an organic liquid with inorganic or organic solvent. Thus the process is adapted for the separation of a lacquer solvent mixture and to its separate components for example, alcohol may be separated from its admixture with toluene or esters may be separated from admixtures with aliphatic hydrocarbons of any of these systems may be concentrated with respect to one ingredient while the other ingredient is separated therefrom by evaporation through the membrane.

For treating aqueous liquid compositions the semi-permeable membrane there may be used any hydrophilic sheet material such, for example, as parchment papers, sheets made from leather waste as sold under the trade names "Brechteen" and "Naturin" and pellicles made from any film-forming organic plastic material as a class. For the treatment of aqueous fluid compositions where it is desired to cause the diffusion and separation of water or water-miscible organic compounds from inorganic or organic substances whether liquid or solids, there is preferably employed a hydrophilic organic plastic membrane such for example as regenerated cellulose or cellulose hydrate which has been produced by regeneration from viscose or from solutions of cellulose in inorganic or organic solvents or from cuprammonium cellulose or by the de-esterification of cellulose esters such as by the denitration of cellulose nitrate, also membranes formed of alkali-soluble, water-insoluble cellulose ethers, gelatine (insolubilized), casein, alginates, and the like film-forming hydrophilic plastic materials. Such membranes are employed in the wet gel state, i. e., while they are swollen with water.

On the other hand, when it is desired to separate a hydrophilic organic liquid from water or organic compound of a different type there may be employed hydrophobic colloidal membranes as a class of which there may be given by way of example, membranes formed of synthetic resins such as polyvinyl resins, methyl methacrylate resins, chloroprene, nylon, chlorinated rubber and the like, or from an organic solvent-soluble cellulose derivative such for example as a cellulose ester, cellulose ether, mixed cellulose ester, mixed cellulose ether, a mixed ether ester of cellulose, as well as membranes formed of two or more resins or two or more cellulose derivatives, also membranes formed from a mixture of a hydrophobic resin with a hydrophobic cellulose derivative. When hydrophobic membranes are employed they are preferably used in the swollen gel state, i. e., while they are saturated with the organic liquid which it is desired to evaporate through said membrane.

It has been found that the rate of evaporation of water through a hydrophilic membrane of the class described is substantially the same or in some cases even greater than the evaporation of water from the surface of a body of water when the area temperature employed and all other conditions of the test are identical. It is believed that this phenomenon can be explained by the fact that the liquid dissolves in the membrane on the one surface, diffuses through the membrane and evaporates from the other surface, the evaporation being so efficient that for all practical purposes it may be considered that the membrane does not exist, that is, the membrane does not appear to retard the evaporation of the liquid. The rate of evaporation of liquid between two vertically-positioned membranes is the same as if the liquid were standing alone and evaporation taking place from both surfaces. The membranes employed in the present process or apparatus may be in the form of sheets the liquid being confined between the surface of one of said sheets and another surface or between two sheets or the membrane may be used in the form of a seamless tubing which may be circular, elliptical, square or rectangular in cross section, as desired.

By way of illustrating but not by way of limiting the invention there will be described two embodiments of an apparatus suitable for carrying out the process of the present invention.

Figure 2:
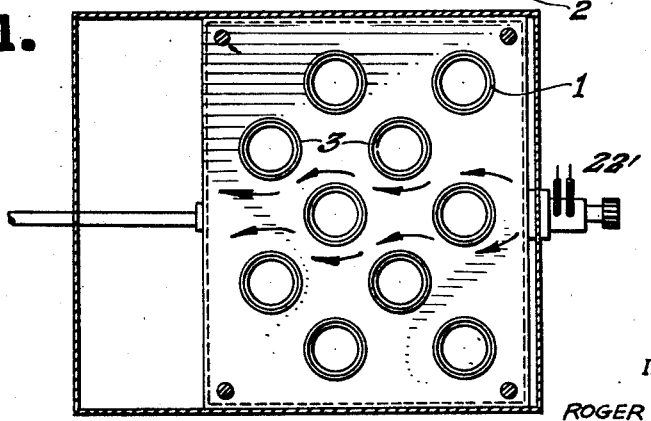
Fig. 2 is a top plan view partly in section of the associated membranes used in the apparatus shown in Fig. 1.

Referring to Figures 1 and 2 there is shown an embodiment of the apparatus in which the membranes are in the form of a plurality of tubes 1 which are disposed in a vertical manner and ends fastened to a base container 2 by means of the cylindrical necks 3 and the upper ends of the tubing being connected to a header container 4 by means of the neck pieces 3'. The ends of the tubing 1 are slipped over the outside of the neck pieces 3 and 3' and fastened thereto by means of string, a wire or a band which can be tightened to form a liquid-proof seal. The lower tank 2 communicates through pipe 5 to a reservoir 6 in which a liquid is maintained at a constant level by means of the supply pipe 7 which is provided with an outlet valve 8 actuated by means of the float 9 through the lever 10. The upper tank or header 4 may also communicate with the reservoir 6 through pipe 11 which is provided with a valve 12. The liquid in the upper tank 4 is maintained at a constant level as a result of the overflow of the inverted U-shaped overflow pipe 13 from which the liquid in the upper tank 4 is periodically or continuously withdrawn. The upper tank 4 is provided with a float 17 which, through the lever 18 actuates an elctric switch 14 which is in circuit with an electromagnet valve 15 positioned in the supply line 5. If one of the tubes 1 bursts during the process the level of the liquid in the header 4 will drop thus causing the electric switch 14 to close the valve 15 in the supply line 5. When a tube bursts, the liquid will be caught in the base tray and when the level of the liquid rises sufficiently to raise the float 17', the valve 14a will also act to close the valve 15 in the supply line 5.

To fill the system the valve 16 in the supply line 7 is opened and the fluid filled into the reservoir 6, the valve 12 in the supply line 11 is open permitting the fluid to flow into the upper tank or header 4. Since the level in the liquid of the upper tank is not sufficient to cause the electric switch 14 to open the valve 15, this valve will remain closed until the tubes and the lower tank 2 have been completely filled. When the level of the liquid in the header 4 causes the switch 14 to be actuated this will open the valve 15 in the supply line 5. When this occurs the valve 12 in the line 11 is closed by hand and the fluid system is then in automatic operation.

To promote the evaporation of the liquid through the walls of the tubing 1 there is provided means for causing a circulation of air or a gas such as the fan indicated generally as 20 which fan is preferably provided with a heating coil 22 so that the air or gas can also be heated. The fan is preferably positioned near the base of the tubing 1 and the air or gas blown across the tubing and deflected by means of the curved deflector 21 which will cause the air or gas to flow over the upper portions of the tubing 1. The air current from the fan may be confined during its lower passage over the lower tubing by means of partition P. The air current coming from the upper section of the tubing 1 may be vented to the atmosphere or it may be passed over a conventional refrigerating unit or a condenser of conventional type or a conventional dehydrator such as one using an absorbent as hydrated alumina or silica gel, wherein the liquid vapor carried in the air stream can be condensed or absorbed and the dry or liquid free air thus resulting can be re-circulated through the fan 20 and heater 22, by providing a suitable closed system therefor.

In addition to heating the air which flows over the membrane the fluid composition which is treated in the system may likewise be heated. This is preferably accomplished by heating the liquid while it passes through the lower tank 2 by means of electric heater 22' the heated liquid rises directly through the casing. In this way the cooling effect resulting from the evaporation is partly offset because the heat is applied to the composition immediately before it enters the tubing. If desired cylindrical electrical heating units may be positioned inside each of the several tubes 1 used in the apparatus. In order to increase the efficiency of the evaporation the first tubings are arranged in staggered relation to each other as shown in the top plan sectional view of Fig. 2 the arrows indicating the flow of air. The drip pan is positioned under the tubes 1.

Figure 3:
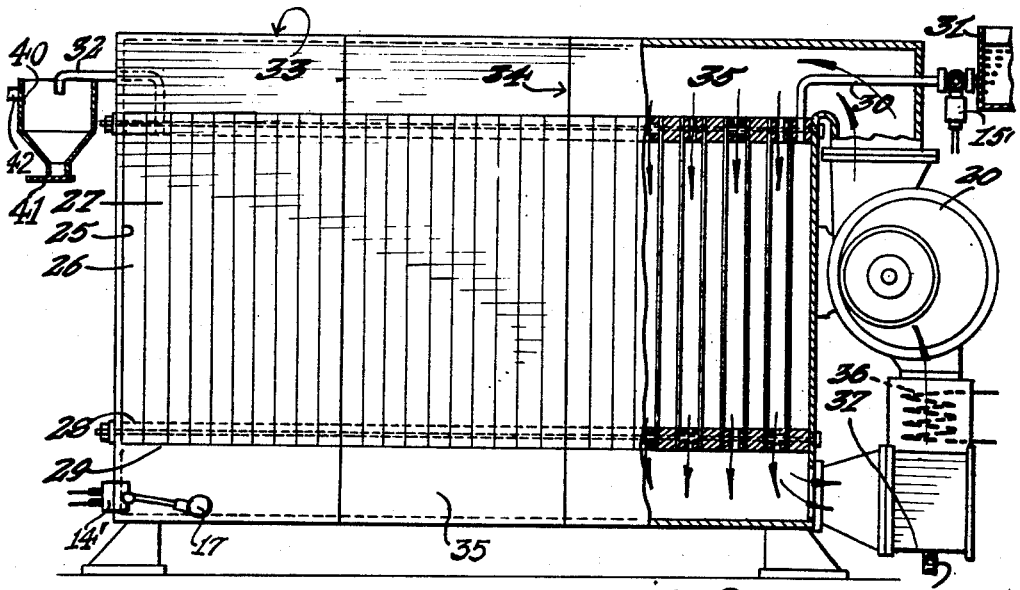
Fig. 3 is a side elevation partly in section of a second embodiment of the apparatus of the invention.
Figures 4, 5:
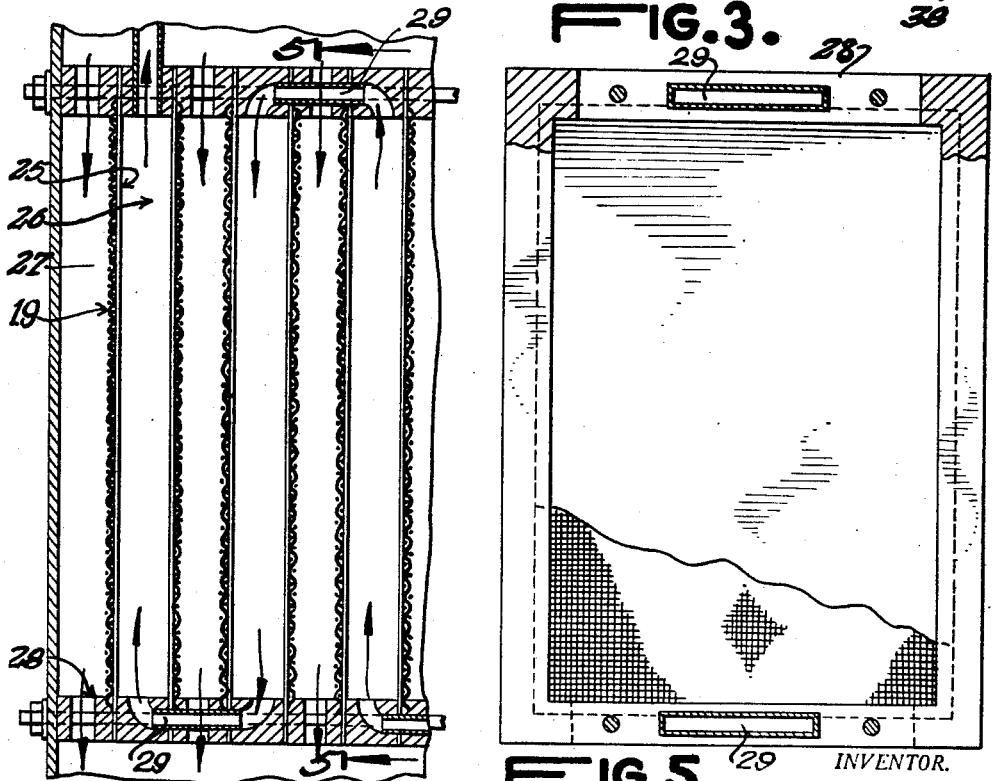
Fig. 4 is an end elevation in section of a few of the cells forming a part of the apparatus shown in Fig. 3.
Fig. 5 is a side elevation of one of said cells.

There is shown in Fig. 3 a second embodiment of the apparatus of the invention which comprises a closed system with respect to the air or gas circulated therein, and in which the semi-permeable membrane is in the form of a sheet 25 the liquid or fluid composition 26 being confined between two such sheets to form a cell, the cells being positioned in vertical manner while an air space 27 is left between each cell. A screen 19 positioned on the outside of each membrane prevents the membrane from bursting under the pressure of the liquid. A multiplicity of such unit cells having the membranes on each side are arranged in a row by fixing the sheets in frames 28 which are provided with passages 29 alternatively to the top and bottom of the membranes so that the liquid is forced to pass in a circuitous path between all the membranes in flowing from one end of the apparatus to the other. Thus the liquid enters through the supply line 30 which is connected to the reservoir 31 which is provided with a conventional constant level device of the type described in Fig. 1. After passing through all of the cells formed by the pair of membranes the liquid is withdrawn through the take-off pipe 32 which leads to a reservoir 40. Inside the chamber 35 at the base there is provided a float 17 which actuates the electric switch 14' which is in circuit with the electromagnet valve 15' in the supply line 30. If the reservoir 40 is provided with a tapering bottom having a gate valve 41 as shown, it may be used for cooling the concentrated liquid and the crystals thus produced may be withdrawn through the bottom, the liquid flowing out through the pipe 42. Thus the fluid and electric systems employed in the apparatus illustrated in Fig. 3 are substantially identical with that shown in Fig. 1. If one of the membranes breaks the drop in the level of the liquid in the reservoir 40 will actuate the electromagnet and close the supply line 30. It is to be understood that other conventional methods may be employed for closing supply line 30 instead of the means illustrated.

The rack of cells is preferably housed in a chamber 33 which is provided with partitions 34 so that the air screen is caused to pass in a circuitous manner first over the cells which are filled with the incoming liquid and last over the cells containing the more concentrated liquid. The air is then caused to flow through this path by means of the blower or fan 20 which may be provided with conventional heating elements not shown. The air coming from the cells through the bottom channel 35 is preferably passed over the cooling coils 36 or through a conventional dehydrator (not shown) or a condenser wherein the liquid contained in the air stream is caused to condense and flow into the drip pan 37 from which it may be drained through the pipe 38. The air from the cooling coils then passes back into the fan and heater 20.

While two embodiments of the apparatus have been described above it is to be understood that the form of the membranes and the arrangement thereof as well as the means for causing the liquid to flow, the means for heating the liquid and the means for heating the air stream and for refrigerating the air stream can be varied in any desired manner without transcending the principles of the present invention.

The rate of evaporation of the liquid through the membranes in the process of the invention may be varied according to the operating conditions. It is important that the membrane be in a swollen gel state, that is, swollen with the liquid which it is intended to evaporate through the membrane. The rate of evaporation can be greatly increased by heating the liquid which is in contact with the membrane as well as by heating the air stream which passes over the other side of the membrane. The temperature to be employed in each case will depend upon the heat stability of the fluid composition being treated and the thermoplastic properties of the membrane. For example, with hydrophilic membranes and aqueous liquids which are not heat-unstable, temperatures up to 100° C. may be employed. The rate of evaporation is also greatly increased by increasing the velocity of the air 44° C. and the temperature of the inert gas on the outside of the membrane is maintained at 40° C. It is possible to evaporate from the latex from 800 to 1000 cc. per hour per square meter. When air is used in place of inert gas or ammonia it is found that rubber solids are precipitated on the inside of the membrane and this rubber deposit retards further evaporation of the water from the latex. Care should be taken that the inert gas employed does not contain any carbon dioxide as this gas causes a rapid coagulation of the latex. However, using inert gas and a continuously flowing stream of latex no substantial deposit of rubber solids occurs during the evaporation and the colloidal character of the latex does not show any substantial change.

When fruit juices are evaporated according to the process of the invention there is preferably used a closed system with nitrogen or some other inert gas instead of air in order to prevent changes in the oxidative enzymes which are present in the fruit juices. When this precaution is taken however, the evaporation of water from fruit juices is very rapid and the evaporation of from 3200 to 3600 cc. of water per hour per square meter can be readily obtained using the process and apparatus of the present invention.

It is apparent from the above disclosure that the present invention has numerous advantages over prior processes of separating, concentrating and evaporating fluid compositions. Chief among these is that the evaporation in the present invention occurs continuously so that it is not necessary to stop the operation and handle the materials in batches. Moreover the present invention provides means for preventing undesirable changes in heat-unstable compositions such as milk, coffee extracts, latex, blood, fruit juices and the like. The evaporation according to the present invention is extremely rapid, as rapid as if the membrane did not exist between the fluid and the atmosphere. Accordingly, the present invention provides a simple, economical and rapid method of separating, concentrating or evaporating liquids and the separation of liquids from liquids or liquids from solids. Particularly in the food industry the present invention provides a process by which fruit juices may be continuously, rapidly and efficiently dehydrated without altering the essential character or flavor of the fruit juices and also provides means for carrying out such a rapid process while operating at a low temperature thus rendering the process more economical and preventing adverse changes in composition.

Since many changes may be made in the process and many different embodiments of the apparatus are possible following the principles of the invention, the invention is not to be limited except as indicated by the appended claims.

Having described our invention, what we claim as new and desire to secure by Letters Patent is:

1. A process for the continuous separation of a liquid from a liquid composition containing a plurality of component substances comprising passing said liquid composition into contact with one side of a semi-permeable membrane comprising a non-fibrous organic plastic pellicle in the gel state, the other side of which membrane is exposed to a closed gaseous atmosphere unsaturated with said liquid, and continuously evaporating a liquid from the composition through said membrane into said atmosphere while continuously circulating said atmosphere over said membrane and removing the evaporated liquid from said atmosphere at one point in its circuit, and continuously drawing off the material which does not pass through said membrane.

2. A process for the continuous evaporation of water from an aqueous composition containing a plurality of component substances comprising passing said aqueous composition into contact with one side of a semi-permeable membrane comprising a hydrophilic non-fibrous organic plastic pellicle in the gel state, continuously circulating over and in contact with the other side of said membrane a gaseous atmosphere unsaturated with water and continuously evaporating water from said composition through said membrane into said atmosphere and continuously drawing off that part of said composition which does not pass through said membrane.

3. A process for the continuous separation of a hydrophilic organic liquid from a liquid composition containing a plurality of component substances comprising passing said liquid composition into contact with one side of a semi-permeable membrane comprising a hydrophobic non-fibrous organic plastic pellicle in the gel state, continuously circulating over and in contact with the other side of said membrane a gaseous atmosphere unsaturated with said organic liquid and continuously evaporating said organic liquid from said composition through said membrane into said atmosphere and continuously drawing off that part of said composition which does not pass through said membrane.

4. A process for the continuous concentration of coffee extracts comprising passing said coffee extract into contact with a semi-permeable membrane comprising a hydrophilic organic plastic pellicle in the gel state and exposing the other side of said membrane to a closed, gaseous atmosphere consisting of a gas inert with respect to said coffee extract and continuously evaporating water from said coffee extract through said membrane into said atmosphere.

5. In an apparatus for the separation of a liquid from a liquid composition containing a plurality of component substances, the combination of a closed chamber and an evaporating cell positioned in said chamber, the walls of which comprise a semi-permeable membrane, means for continuously passing a liquid composition through said cell, means for circulating a gas over the exterior surface of said membrane and means for extracting from said gaseous atmosphere the liquid which evaporates through said membrane, and means for continuously removing the material which does not pass through said membrane.

ROGER N. WALLACH.
JUSTIN ZENDER.